3,565,687
MANUFACTURING METHOD OF XYLOSE WITH COTTONSEED HULLS AS MATERIAL

Kinshi Suminoe, Tokyo, and Kunitsugu Okamura, Osaka, Japan; said Okamura assignor to Okamura Seiyu Kabushiki Kaisha, Osaka-fu, Japan
No Drawing. Filed Feb. 26, 1968, Ser. No. 711,154
Int. Cl. C13k 1/02, 9/00
U.S. Cl. 127—37                    3 Claims

ABSTRACT OF THE DISCLOSURE

A method of manufacturing xylose from cottonseed hull involving the steps wherein (1) cottonseed hull, after adding 0.1% to 1.0% alkali solution thereto, is heated under a pressure between ambient and 1 kg./cm.$^2$ gauge, the resultant impurities dissolved in the said solution being removed therefrom, (2) the thus treated cottonseed hull is then hydrolyzed by heating with sulfuric acid and the acetic acid by-product removed from the resultant saccharified solution by evaporation by blowing steam across the solution; and (3) the solution of step 2 is neutralized by adding lime thereto, the resultant precipitate is filtered and the residual lime is removed from the resultant filtrate by adding oxalic acid thereto and causing the lime to precipitate.

---

This invention relates to a method of obtaining xylose of high quality from cottonseed hull on a commercial scale at a lower cost and with higher yield by obviating the adverse factors which affect the yield as well as quality, and are inevitable in case of the known processes.

The essentials of the invention comprise:

(1) A step in which cottonseed hull is boiled with dilute alkali under a pressure that of between normal (ambient) and 1 kg./cm.$^2$, the resultant impurities dissolved in the solution are removed and the hull is washed with ample water.

(2) A step of evaporating a major part of acetic acid, a by-product of hydrolysis, by blowing of steam, from the saccharified solution which is obtained by saccharification of the cottonseed hull with sulfuric acid already subjected to the foregoing pre-treatment.

(3) A step in which the saccharified solution, after separation of the waste hull, is neutralized with lime, and the precipitates of calcium salts produced are separated by filtration, thus obtaining a neutralized saccharificated solution. The solution still contains a small quantity of dissolved calcium sulfate and calcium acetate, which, being obstructive factors for crystalization of xylose, are removed as precipitate of calcium oxalate by adding oxalic acid.

Cottonseed hull not only contains abundant quantities of pentosan from which xylose is obtainable by means of hydrolysis thereof but also yields xylose almost exclusively, scarcely producing dextrose and other saccharides as by-products. Therefore, cottonseed hull is superior in quality to any other materials for commercial production of xylose. However, when xylose is manufactured from cottonseed hull by means of the known processes, high yield and good quality are not to be expected in view of the following difficulties.

The known process of manufacturing xylose from vegetable or wooden materials which are rich in pentosan is as follows: The saccharified solution which is obtained by boiling the said materials together with dilute sulfuric acid under a certain pressure is neutralized with lime, the resultant solution is subjected to decolorization and removal of impurities with active carbon, ion exchange resins etc., after calcium salts are separated by filtration, and crystals of xylose by cooling the syrup which has been condensed by evaporation.

However, as cottonseed hull contains peculiar obstructive materials, it is inevitable that the traditional processes should be confronted with the following three difficulties.

Difficulty No. 1: As cottonseed hull contains a considerable quantity of tannic acid and other obstructive materials, if hydrolysis is carried out directly with dilute acid according to the known process, the syrup is tinged dark brown and, moreover, crystalization is made difficult owing to existence of various impurities, and burdensome process and much expenses are required to remove such impurities.

Difficulty No. 2: Particularly when cottonseed hull is used as a starting material, a considerable volume of acetic acid (2.8% to 3% of raw material) is produced as by-product during hydrolysis, and even though the considerable part of this acid can be removed by blowing of steam, severe blowing of steam to eliminate the acetic acid is not only uneconomical but also gives a dark color to the solution that is fatal for the final product. But moderate blowing of steam results in the following difficulty.

Difficulty No. 3: Acetic acid which remains after blowing of steam produces calcium acetate by neutralization of saccharified solution with lime, and the considerable part of this salt, being of high solubility, remains in the solution even after the separation of the precipitate, and becomes troublesome during the subsequent process of refining and crystalization.

The first advantage of the present invention consists in the fact that obstructive materials can be removed by the pretreatment of cottonseed hull with dilute alkali solution with greater effect as shown in the following table, as compared with the known pre-treatment with water or dilute acid, and an increase of yield of xylose is therefore made possible.

| Pre-treatment | | True purity | Color of saccharified solution | Degree of crystallization |
|---|---|---|---|---|
| None | | 60.7 | Dark brown | None. |
| Known process | With water — Pressure, 1 kg./cm.$^2$. | 65.8 | Brown | Poor. |
| | With sulfuric acid — 0.1% | 67.1 | Pale brown | Medium. |
| | 0.5% | 70.0 | Yellowish brown | Do. |
| Process of invention | With ammonia water — 0.1% | 75.2 | ___do___ | Good. |
| | 0.5% | 73.7 | ___do___ | Do. |

In place of ammonia water, sodium or potassium compounds are also applicable.

The second advantage of the invention relates to the foregoing Difficulty No. 2, i.e. production of acetic acid in considerable volume. This difficulty can be removed by evaporating a major part of acetic acid by blowing of steam to the saccharified solution.

It is unavoidable that a small quantity of acetic acid should remain in the solution; steam blowing for long periods of time should be avoided because of the risk of discoloring the saccharified solution and also because of the economics involved.

This difficulty, however, can be removed by the third advantage of the invention.

The third advantage of the invention is as follows: The acetic acid mentioned above and sulfuric acid left in the solution in a residual quantity, form calcium acetate and calcium sulfate by neutralization of the saccharified solution with lime. The salts are easily soluble in water and normally causes various troubles in refining and crystallization. Though these salts can be removed by ion exchange resins, a large quantity of resin is required. In this invention a small quantity of oxalic acid is added to the neutralized solution and calcium is removed as calcium oxalate, and though a small quantity of sulfuric acid and acetic acid remain in the solution, it is quite easy to remove them effectively with ion exchange resins.

In detail, the whole process of the invention is as follows: Cottonseed hull, with a dilute alkali solution of 0.1% to 1.0% added thereto, is boiled for about 30 minutes under a pressure between normal pressure and 1 kg./cm.$^2$, and the resultant tannic acid and other impurities dissolved in the solution are removed. The cottonseed hull subjected to the foregoing pre-treatment is saccharified by boiling for 60 to 100 minutes under a pressure between normal pressure and 2 kg./cm.$^2$ with 2% to 7% sulfuric acid, and the major part of acetic acid produced as by-product is expelled by means of blowing of steam of 100° C. to 150° C. Then after sulfuric acid and a small quantity of acetic acid remaining in the saccharified solution are neutralized with lime, and the precipitate of calcium salt is removed by filtration, a sufficient quantity of oxalic acid is added slowly until calcium oxalate is no longer precipitated, and the precipitate of calcium oxalate is removed by filtration. The saccharified solution thus obtained is purified with active carbon, ion exchange resin etc. Then by vacuum condensation the syrup is condensed to a certain concentration suitable for crystallization of xylose.

EXAMPLE 1

4 kg. of cottonseed hull with 16 l. of 0.1% ammonia water was boiled for 30 minutes under the pressure of 1 kg./cm.$^2$, and the waste liquid was removed, the solid being washed with warm water several times, and the water was removed. The pretreated cottonseed hull with 16 l. of 3% sulfuric acid added thereto was boiled for saccharification for 90 minutes under the pressure of 1 kg./cm.$^2$, and the saccharified solution was filtrated. Thus saccharified solution of 75.4% true purity was obtained. The major part of free acetic acid was evaporated by blowing of steam of 100° C. for 30 minutes. The precipitates of calcium sulfate and calcium acetate, which are produced by adding calcium carbonate, were separated by filtration, and a solution of Brix 35° was obtained by vacuum condensation of the filtrate. Oxalic acid was added to this condensed xylose solution, and the resultant precipitate of calcium oxalate was removed. Thus a solution 88.2% of true purity was obtained.

The xylose solution was treated with active carbon, passed through strong acid ion exchange resin and basic ion exchange resin, and then vacuum condensed. Thus colorless syrup of Brix 71° and true purity of 93.7% was obtained.

The said syrup was seeded and left to cool, and by separating the resulting crystal by filtration, 830 g. of white xylose crystal was obtained from 4 kg. of cottonseed hull.

EXAMPLE 2

500 kg. of cottonseed hull with 2,000 l. of ammonia water was boiled for 30 minutes under normal pressure, and the waste liquid being removed, the solid was washed several times with cold water. The cottonseed hull subjected to the foregoing pre-treatment, with 1,500 l. of 4% sulfuric acid added thereto, was boiled for saccharification for 100 minutes under normal pressure, and the saccharified solution was filtered. Thus raw xylose solution 73.5% of true purity was obtained. By blowing steam of 120° C. across this saccharified solution for 20 minutes, the major part of free acetic acid was expelled. Then milk of lime was added thereto, the resultant precipitates of calcium sulfate and calcium acetate were separate by filtration, and a solution of Brix 35° was obtained by vacuum condensation. To this condensed xylose solution oxalic acid was added, and the resultant precipitate of calcium oxalate was separated by filtration. Thus syrup of 86.9% true purity was obtained.

This xylose solution was treated with active carbon, and passed through strong acid ion exchange resin and strong basic ion exchange resin in turn, and then vacuum condensed. Thus colorless syrup of Brix 71° and true purity of 92.9% was obtained.

After seeding and cooling this syrup, the resultant crystal was filtered by a centrifugal separator. Thus 89 kg. of white crystal of xylose was obtained from 500 kg. of cottonseed hull.

EXAMPLE 3

500 kg. of cottonseed hull after adding thereto 2,000 l. of 0.1% ammonia water was boiled for 20 minutes under the pressure of 1 kg./cm.$^2$, and the solid, after removing the waste liquid, was washed several times with cold water. The cottonseed hull subjected to the foregoing pre-treatment, after adding thereto 1,500 l. of 5% sulfuric acid was saccharified for 90 minutes under the pressure of 1 kg./cm.$^2$, and the resultant saccharified solution was filtered. Thus raw xylose solution of 75.3% true purity was obtained. By blowing of steam of 150° C. across this solution for 10 minutes, the major part of free acetic acid was evaporated. Then milk of lime was added, the resultant precipitates of calcium sulfate and calcium acetate were separated by filtration, and a solution of Brix 35° was obtained by vacuum condensation. By adding oxalic acid to this condensed xylose solution and separating the resultant precipitate of calcium oxalate by filtration, a solution of 87.5% true purity was obtained.

This xylose solution was treated with active carbon, passed through strong acid ion exchange resin and strong basic ion exchange resin in turn, and then vacuum condensed. Thus colorless syrup of Brix 71° and true purity of 93.5% was obtained.

After seeding and cooling this syrup, the resultant crystal was filtered by a centrifugal separator. Thus 92.8 kg. of white crystal of xylose was obtained from 500 kg. of cottonseed hull.

What we claim is:

1. A method of manufacturing xylose from cottonseed hull which comprises:
   (1) boiling a mixture of cottonseed hull and 0.1–1.0% alkali solution under a pressure between ambient pressure and 1 kg./cm.$^2$ gauge and separating the resulting solution containing impurities from the cottonseed hull,
   (2) saccharifying the resulting cottonseed hull by adding sulfuric acid to said cottonseed hull and heating the resulting mixture,
   (3) removing from the resultant mixture of step 2 the major amount of acetic acid by-produced in step 2 by means of blowing steam,
   (4) neutralizing the resultant mixture of step 3 by adding a lime solution thereto and removing the resultant precipitates,
   (5) adding oxalic acid to the resultant solution of step 4 to precipitate substantially all of the calcium as calcium oxalate and removing said calcium oxalate from the solution, and
   (6) crystallizing the xylose from the resultant solution of step 5.

2. A method according to claim 1 wherein immediately subsequent to step 5 the resultant solution of step 5 is purified by means of active carbon or ion exchange resins.

3. A method according to claim 2 wherein the cottonseed hull pre-treated in step 1 is washed with water to remove substantially all impurities therefrom prior to step 2.

References Cited

UNITED STATES PATENTS

| | | | |
|---|---|---|---|
| 2,868,778 | 1/1959 | Watson | 127—37X |
| 2,900,284 | 8/1959 | Oshima | 127—37 |

OTHER REFERENCES

W. T. Schreiber: Ind. Eng. Chem., 22, 497–501 (1930).
C.A. (1) 51:7712c (1957).
C.A. (2) 53:15556e–15557d (1959).

MORRIS O. WOLK, Primary Examiner

S. MARANTZ, Assistant Examiner

U.S. Cl. X.R.

127—46